(12) United States Patent
Jourdin

(10) Patent No.: US 7,207,452 B2
(45) Date of Patent: Apr. 24, 2007

(54) DEVICE FOR FASTENING A DISTRIBUTION COMPONENT ON A VESSEL NECK

(75) Inventor: Gilles Jourdin, Combon (FR)

(73) Assignee: Valois S.A.S., Le Neubourg (FR)

( * ) Notice: Subject to any disclaimer, the term of this patent is extended or adjusted under 35 U.S.C. 154(b) by 0 days.

(21) Appl. No.: 10/057,406

(22) Filed: Jan. 23, 2002

(65) Prior Publication Data

US 2002/0100742 A1   Aug. 1, 2002

Related U.S. Application Data

(60) Provisional application No. 60/266,078, filed on Feb. 2, 2001.

(30) Foreign Application Priority Data

Jan. 30, 2001   (FR) .................................. 01 01441

(51) Int. Cl.
G01F 11/06 (2006.01)
B65D 88/54 (2006.01)

(52) U.S. Cl. .................. 215/274; 220/319; 222/321.9; 222/570; 215/321

(58) Field of Classification Search .................. 215/28, 215/274, 275, 252, 321, 277; 285/148.19; 222/153.09, 570, 321.7, 321.9, 385; 220/319
See application file for complete search history.

(56) References Cited

U.S. PATENT DOCUMENTS

| 2,124,638 | A | * | 7/1938 | Sheldon et al. ............. 215/252 |
| 2,808,954 | A | * | 10/1957 | Smith ......................... 215/275 |
| 3,823,841 | A | * | 7/1974 | Lovejoy ..................... 215/251 |
| 3,863,798 | A | * | 2/1975 | Kurihara et al. ............. 215/301 |
| 4,220,247 | A | * | 9/1980 | Kramer ....................... 215/219 |
| 4,366,921 | A | * | 1/1983 | Kirk, Jr. ................. 222/153.09 |
| 4,732,549 | A | * | 3/1988 | von Schuckmann ........ 417/472 |
| 4,773,553 | A | * | 9/1988 | Van Brocklin .............. 215/272 |
| 4,944,429 | A | * | 7/1990 | Bishop et al. ......... 222/153.13 |
| 5,246,124 | A | * | 9/1993 | Battegazzore ............... 215/251 |

(Continued)

FOREIGN PATENT DOCUMENTS

EP    0 806 248 A1   11/1997

(Continued)

OTHER PUBLICATIONS

"Rapport De Recherche Préliminaire," EPO Form 1503, Sheet 1 of 1, and "Annexe Au Rapport De Recherche Préliminaire," EPO Form P0465, Sheet 1 of 1, for FR 0101441.

*Primary Examiner*—Anthony D. Stashick
*Assistant Examiner*—James Smalley
(74) *Attorney, Agent, or Firm*—Wood, Phillips, Katz, Clark & Mortimer

(57) ABSTRACT

A device is provided for fastening a distribution component on a vessel neck. The fastening device includes a retainer ring comprising a skirt defining an internal wall and an external wall, with the internal wall adapted to contact the external wall of the neck. The device also includes a lining collar surrounding the skirt of the retainer ring, the lining collar defining an internal wall and a visible external wall. The external wall of the skirt is formed with longitudinal external ribs extending at over the height of the skirt. The external ribs are in fitting contact against the internal wall of the collar.

7 Claims, 7 Drawing Sheets

U.S. PATENT DOCUMENTS

| | | | | |
|---|---|---|---|---|
| 5,269,429 A * | 12/1993 | Schumacher | ................ | 215/249 |
| 5,299,703 A * | 4/1994 | Cater | ........................ | 215/274 |
| 5,642,908 A * | 7/1997 | Mascitelli | ............. | 285/148.19 |
| 5,772,080 A * | 6/1998 | de Pous et al. | .......... | 222/321.7 |
| 5,791,504 A * | 8/1998 | Hofmann et al. | ........... | 215/223 |
| 5,799,810 A * | 9/1998 | de Pous et al. | ............. | 215/274 |
| 5,890,633 A * | 4/1999 | Skillin et al. | ............... | 222/523 |
| 5,941,428 A * | 8/1999 | Behar et al. | ............. | 222/321.7 |
| 6,273,303 B1 * | 8/2001 | de Pous et al. | .......... | 222/402.1 |
| 6,341,706 B1 * | 1/2002 | Neuner | ....................... | 215/40 |
| 6,367,641 B1 * | 4/2002 | Garcia et al. | ............... | 215/330 |
| 6,409,049 B1 * | 6/2002 | de Pous et al. | ......... | 222/153.09 |
| 6,463,650 B1 * | 10/2002 | Bougamont et al. | .......... | 29/453 |
| 6,571,991 B2 * | 6/2003 | Jourdin | .................... | 222/321.9 |
| 6,575,339 B2 * | 6/2003 | Jourdin et al. | ........... | 222/321.7 |
| 6,595,395 B2 * | 7/2003 | Jourdin et al. | ........... | 222/321.9 |
| 6,799,698 B2 * | 10/2004 | Ono et al. | .................... | 222/55 |
| 2003/0000908 A1 * | 1/2003 | Battegazzore | ................ | 215/20 |

FOREIGN PATENT DOCUMENTS

| | | |
|---|---|---|
| FR | 97 12962 A1 | 4/1999 |
| JP | 09110084 A * | 4/1997 |

\* cited by examiner

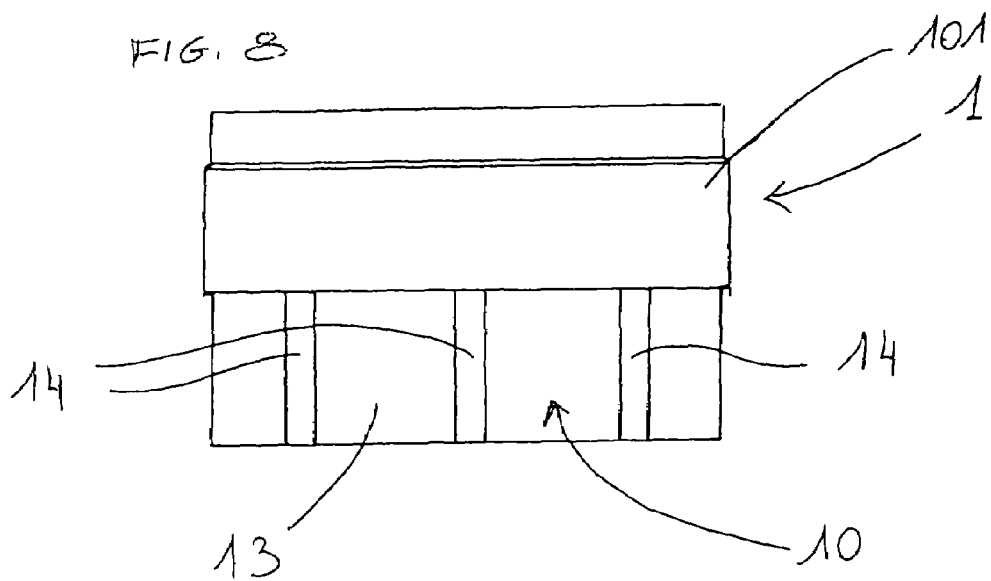
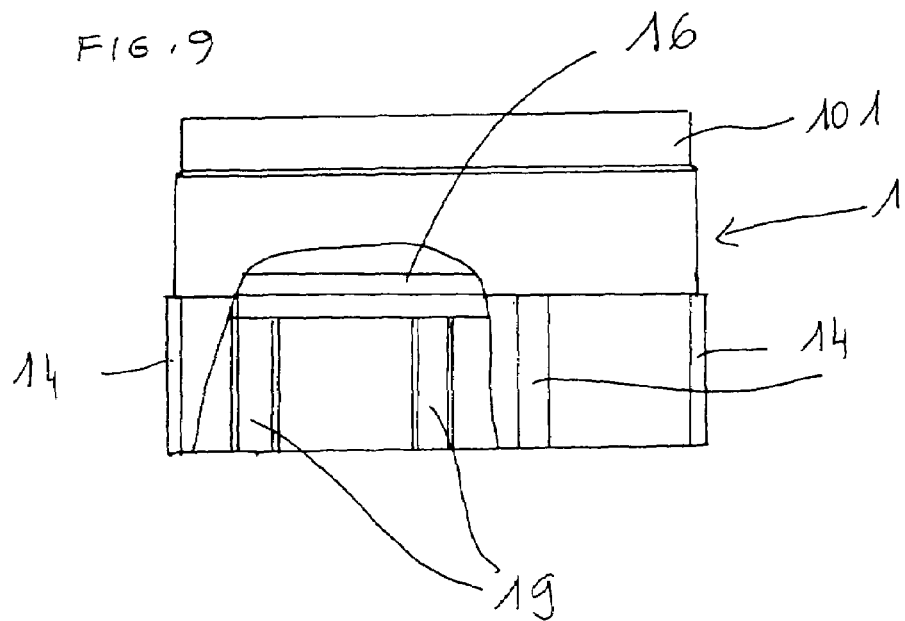

DEVICE FOR FASTENING A DISTRIBUTION COMPONENT ON A VESSEL NECK

CROSS REFERENCE TO RELATED APPLICATION

This application claims the benefit under 35 U.S.C. §119 (e) of pending U.S. provisional patent application Ser. No. 60/266,078, filed Feb. 2, 2001, and priority under 35 U.S.C. §119(a)–(d) of French patent application No. FR-01.01441, filed Jan. 30, 2001.

TECHNICAL FIELD

This invention relates to a device for fastening a distribution component on a vessel neck.

BACKGROUND OF THE INVENTION

More in particular, this fastening device comprises a retainer ring forming a skirt defining an internal wall and an external wall, with the internal wall to contact the external wall of the neck. The fastening device further comprises a lining collar surrounding the retainer ring skirt, this lining collar defining an internal wall and a visible external wall. This is a completely conventional construction for a device for fastening a pump or valve on the neck of a fluid bottle or reservoir. Such a fastening device has its preferred application in the field of perfumery, cosmetics, or else in pharmacy.

In general, the internal wall of the retainer ring skirt is provided with inward projecting profiles, to be received under a shoulder formed by a peripheral thickening of the outward projecting vessel neck. The projecting profiles can be formed at the lower end of snap-on tabs formed by the skirt, or alternatively, the internal wall of the continuous skirt is formed with a peripheral snap-on band. Here again, this is a completely conventional design for a retainer ring skirt. In both instances, selective projecting profiles capable of being seated under the shoulder formed by the peripheral thickening of the neck are used. In both instances, it is not possible to install the lining collar on the retainer ring before installing it on the vessel neck, as the skirt is subject to an outward radial expansion when these projecting profiles pass over the thickening of the vessel neck. Only when the projecting profiles have reached their final position under the shoulder of the thickening can the lining collar be pulled down around the retainer ring skirt.

From U.S. Pat. No. 4,773,553, it is also known to use the lining collar for distorting the lower end of the retainer ring skirt, which is originally projecting outwards. As a result of installing the collar on the ring skirt, the skirt material is flowed inwards under the shoulder of the thickening. Here again, installing the collar on the ring is done only when the retainer ring has been installed on the vessel neck.

BRIEF SUMMARY OF THE INVENTION

This invention proposes another way of fastening the ring on the neck of a vessel. In this case, the external wall of the skirt is formed with longitudinal external ribs extending over the height of the skirt, these external ribs coming into fitting contact with the internal collar wall.

Advantageously, the internal skirt wall is radially distorted inwards at the external ribs.

In this case, before fitting the retainer ring into the lining collar, the internal skirt wall is cylindrical and the ribs together define a maximum diameter greater than the inside diameter of the lining collar.

Therefore, the lining collar is used for distorting the internal skirt wall so as to form longitudinal cams extending at the top, or throughout the skirt height. This fastening device composed of the ring and prefitted collar, can then be installed on a vessel neck. Fastening the ring on the neck is obtained through the fitting contact of the cams formed by the distortion of the ribs against the external neck wall, which does not even have to be formed with a shoulder and a thickening. Tightening the skirt against the external neck wall is done radially and no longer by blocking it under a neck shoulder as in prior art. In order for the ring to be properly fastened on the vessel neck, it is advantageous, and even necessary, for the internal cams formed through radial distortion of the external ribs to be slightly distorted or crushed against the external wall of the vessel neck.

It is also envisaged that the installation of the lining collar on the retainer ring does not generate a distortion of the internal skirt wall, which then remains substantially or perfectly cylindrical. However, when the ring is installed on the vessel neck, the fitting radial contact will also occur at the external ribs in contact with the lining collar previously installed on the ring.

Thus, whether or not the collar generates a distortion of the internal skirt wall has no impact on the technique of fastening the ring on the neck, which is done through a fitting radial contact at the external ribs.

According to another embodiment, the internal skirt wall is formed with longitudinal internal ribs extending over the height of the skirt.

Advantageously, the internal ribs are angularly offset with respect to the external ribs so that an internal rib is located between two external ribs and vice versa.

Preferably, the external skirt wall, between the external ribs, is at a distance from the internal wall of the lining collar so as to create an intermediate clearance. In this case, fastening the ring on the vessel neck is done through a fitting radial contact of the internal ribs against the external neck wall. The intermediate clearance formed between the external ribs allows the internal ribs to distort radially outwards in order to adapt and abut in a radial fitting way against the external wall of the vessel neck.

In every case, it is advantageous for the external ribs to be distributed evenly around the skirt.

The invention will now be explained more in detail with reference to the appended drawings, provided by way of example and not to be restrictive of an inventive embodiment.

BRIEF DESCRIPTION OF THE DRAWINGS

FIG. 8 is a side elevational view of the second embodiment of the retainer ring 1 illustrated in FIG. 5; and FIG. 9 is a view similar to FIG. 8, but in FIG. 9 the retainer ring 1 has been slightly rotated about its vertical axis, and FIG. 9 shows a portion of the ring 1 partially cut away to illustrate interior detail.

DETAILED DESCRIPTION

Figure 1:
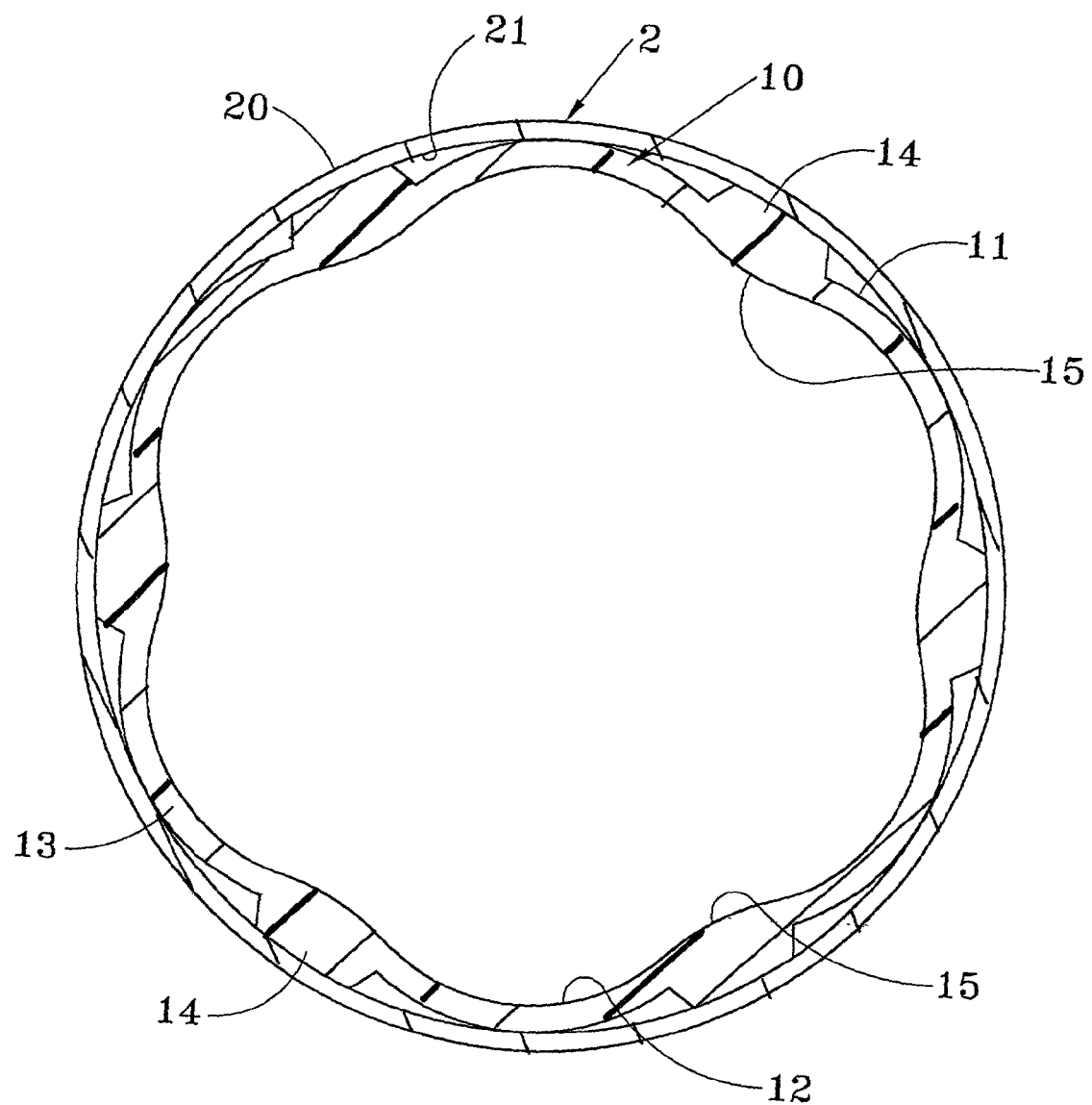
FIG. 1 is a horizontal cross-sectional view through a fastening device of the invention.

In both embodiments, the fastening device of the invention comprises a retainer ring 1 and a lining collar 2. With reference to FIGS. 4a and 4b, they show a vertical cross-section of a fastening device. Although these FIGS. 4a and 4b represent the device of FIGS. 1 to 3, the general shape of the ring and the collar is the same for the embodiment of FIG. 5. In this case, retainer ring 1 comprises a skirt 10 extending downwards from a radial clamp 16 extending internally to form a snap-on groove 17 provided with a through opening 18 for a distribution device 5 such as a pump or valve having an operating rod 51. Retainer ring 1 can further comprise a sleeve 101 advantageously extending into the extension of skirt 10, upwards from radial clamp 16.

Lining collar 2 comprises a substantially cylindrical body 20 ending at its upper end in a tuck-in flap 23 to come in abutment on the upper end of sleeve 101. The body 20 of collar 2 extends around the retainer ring, and more in particular around skirt 10. Thus, the collar 2 comprises an internal wall in contact with the retainer ring and a visible external wall 22.

According to the invention, the external wall 11 of skirt 10 is provided with longitudinal vertical ribs 14 extending over the height of skirt 10. Preferably, the ribs 14 extend throughout the height of skirt 10. This feature is common to both embodiments of FIGS. 1 and 5. Ribs 14 radially project outwards from the external wall 11 of the skirt directly adjacent to ribs 14. The number of ribs 14 is at least three, e.g. six as in both embodiments. The ribs are preferably evenly distributed over the periphery of the external wall of skirt 10.

These ribs 14 come into abutting fitting contact against the internal wall 21 of collar 2. This fitting contact, which occurs radially, allows for lining collar 2 to be perfectly fastened on retainer ring 1. Due to the fact that ribs 14 extend at the top of the skirt, and not selectively, collar 2 is installed in a particularly stable way on the retainer ring. It can therefore be said that the fastening of the collar on the ring is mainly provided through the radial fitting contact of the longitudinal vertical ribs of the skirt against the internal collar wall.

Figure 2:
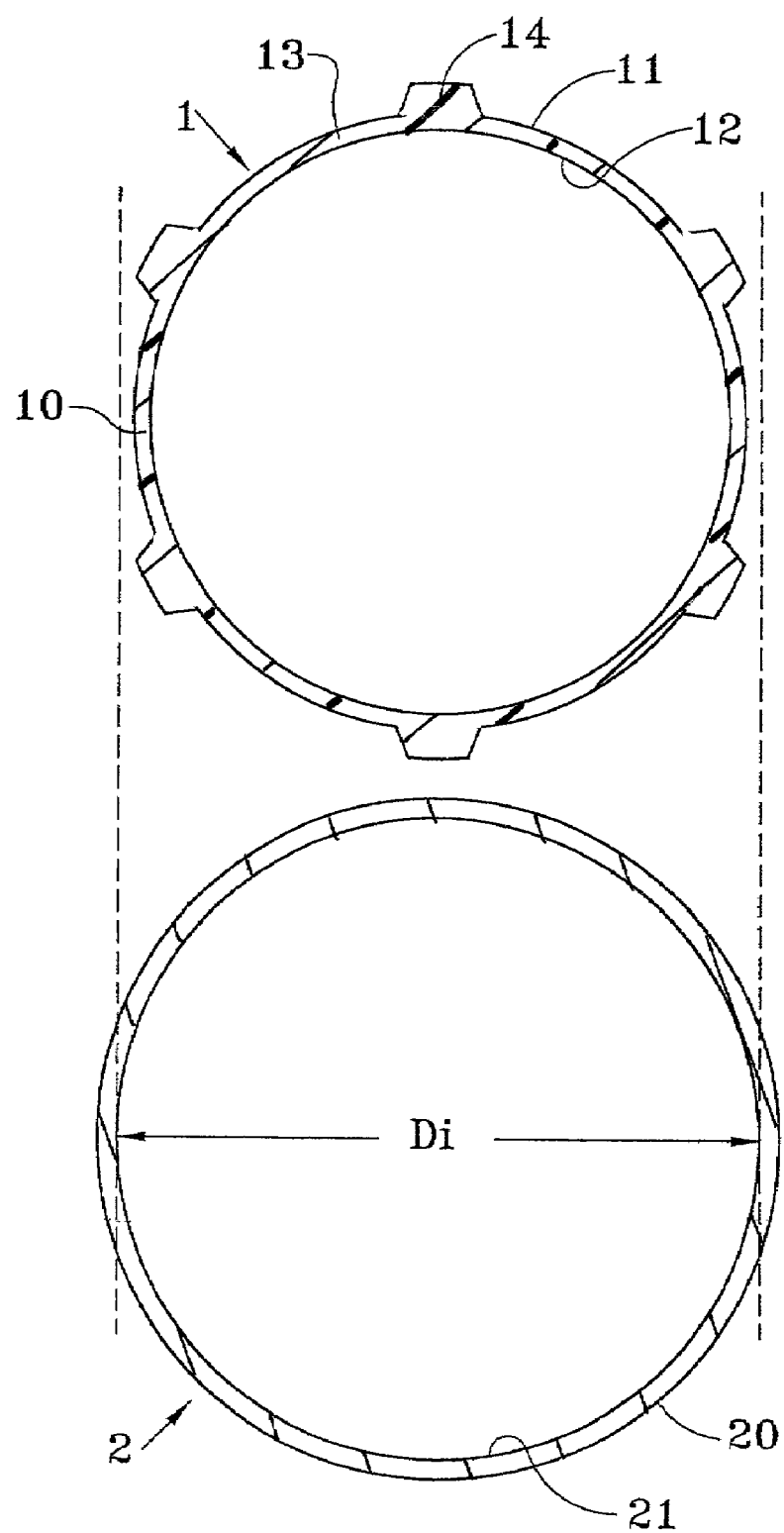
FIG. 2 is a cross-sectional schematic view of the fastening device of FIG. 1 when disassembled to show the diameter ratio between the retainer ring and the collar.
Figure 3:
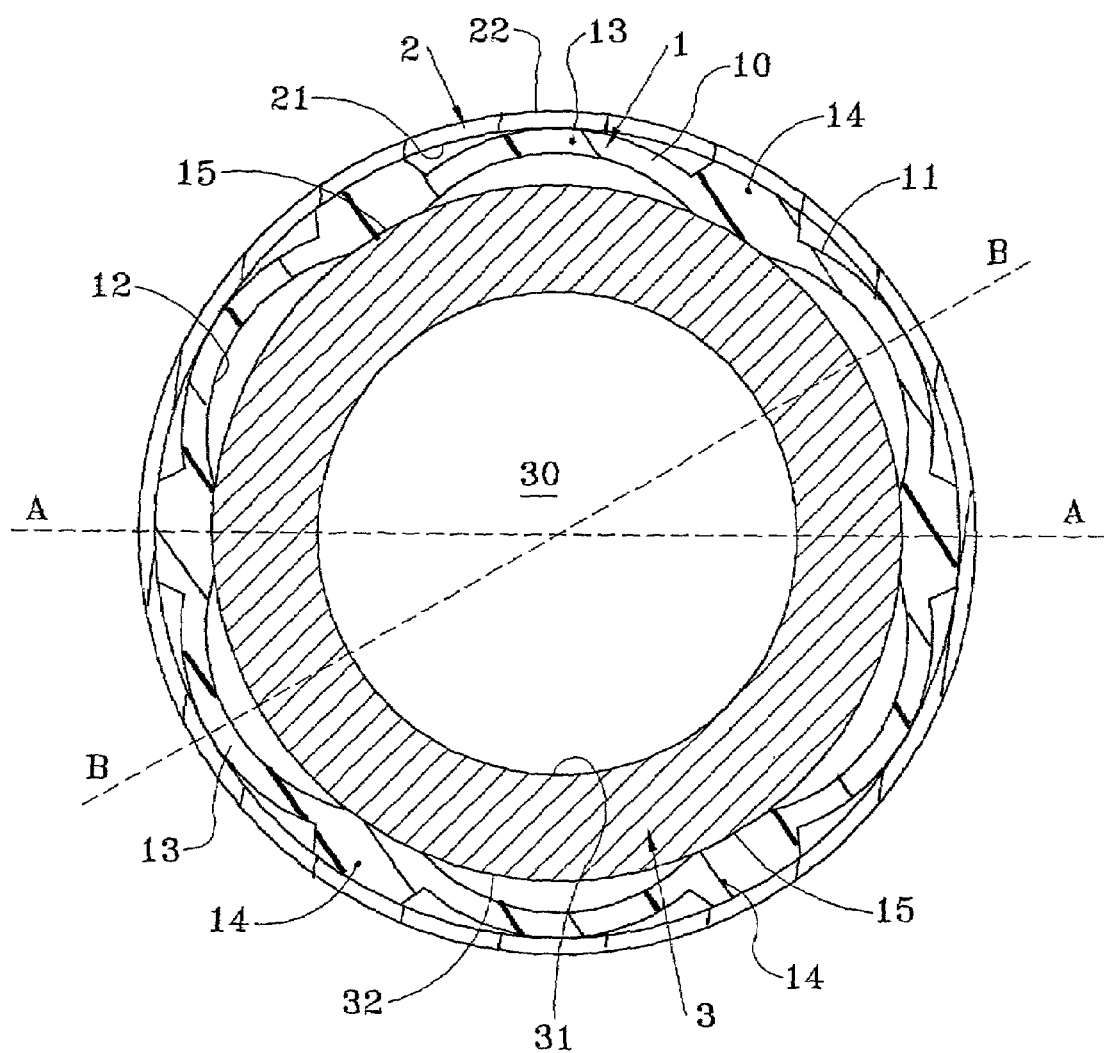
FIG. 3 is a horizontal cross-sectional view of the fastening device of FIG. 1 installed on a vessel neck.
Figure 4B:
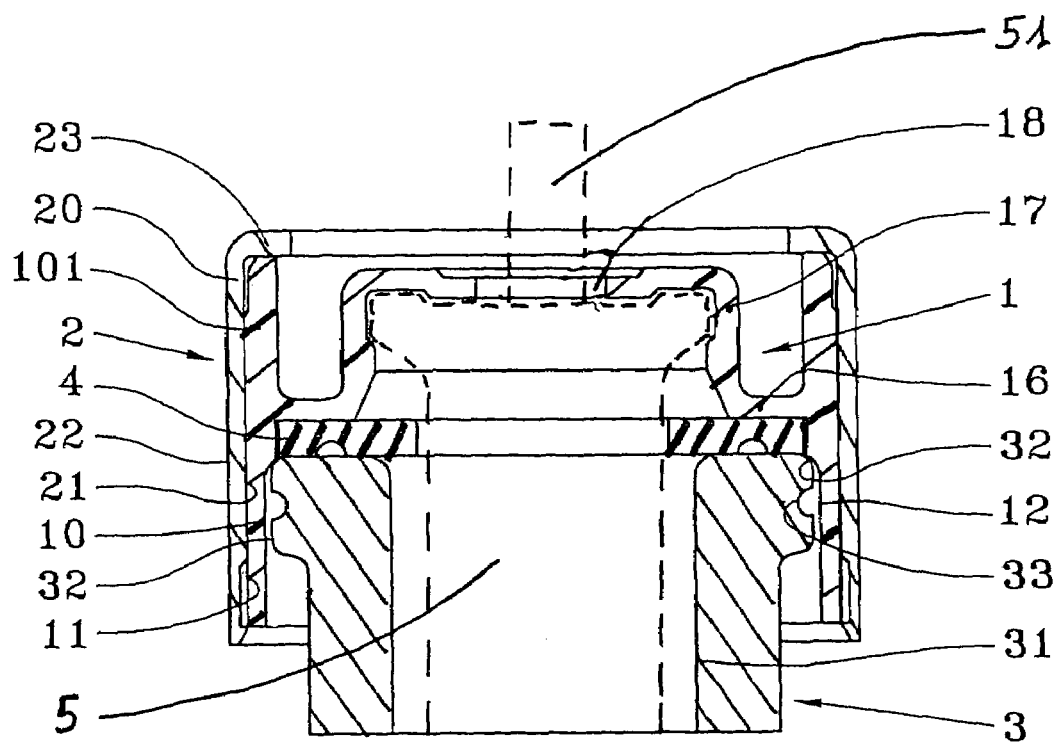
FIGS. 4a and 4b are vertical cross-sectional views, respectively along section lines AA and BB through the fastening device of FIG. 3 installed on a vessel neck.
Figure 4A:
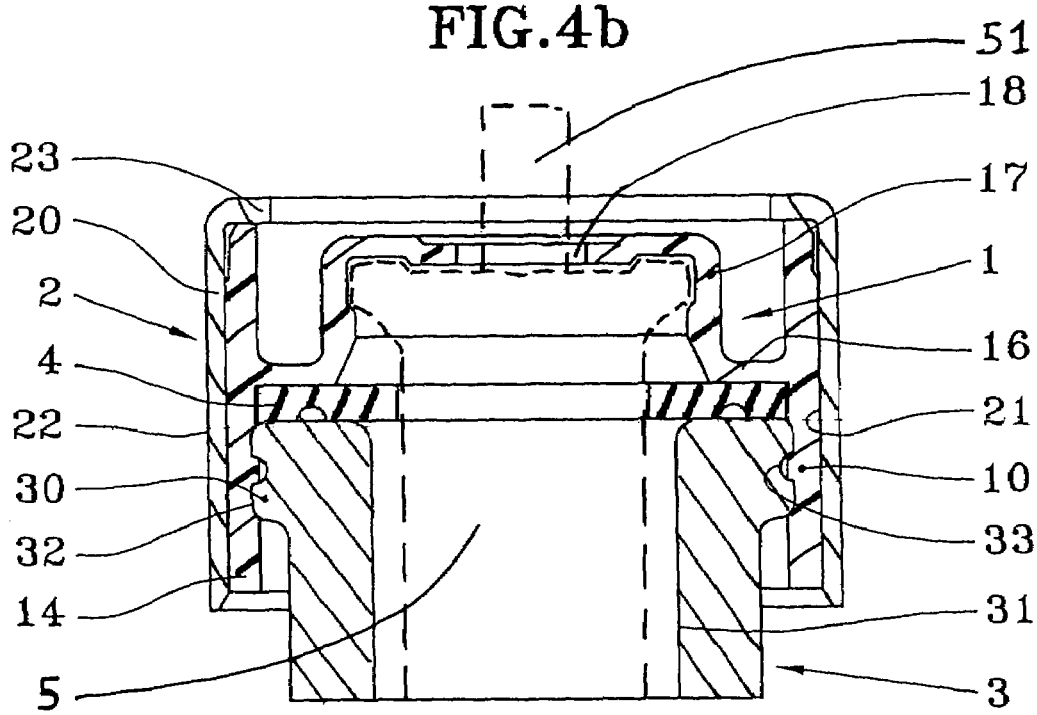

Referring now more particularly to the first embodiment represented in FIGS. 1 to 3, it appears that skirt 10 of the ring has an internal wall 12 that is not perfectly cylindrical, or has a round cross-section as shown in FIG. 1. On the contrary, it appears that the internal wall 12 of skirt 10 forms vertical longitudinal cams 15 at each longitudinal rib 14. Between each rib 14 or each cam 15, the skirt 10 forms connecting segments 13. These connecting segments 13 have a wall thickness that is less than that of ribs 14.

According to the invention, the cams 15 projecting radially inwards are a result of the distortion of skirt 10 due to ribs 14 being displaced radially inwards. This inward radial displacement of ribs 14 is achieved by collar 2 the internal diameter Di of which is smaller than the diameter of the imaginary circle connecting the ends of ribs 14, as can be seen in FIG. 2. Thereby, as a result of inserting or fitting the ring skirt into the collar, ribs 14 are forced radially inwards, which generates a distortion of the internal wall 12 of skirt 10 as illustrated in FIG. 1. On the other hand, the internal diameter Di of the collar is greater than the diameter of the skirt measured at connecting segments 13, as can be seen in FIG. 2. Thus, connecting segments 13 can distort resiliently outwards adopting a convex bend so as to come in contact with the internal wall 21 of the collar, as can be seen in FIG. 1. As connecting segments 13 have a relatively small wall thickness, they consequently have a role of recovering constraints due to the radially inward displacement of ribs 14 under the effect of the collar. Therefore, the internal wall 12 of skirt 10 has a substantially polygonal shape with vertices formed by the bend of segments 13 and sides formed by cams 15 resulting from ribs 14 being displaced radially inwards.

As ribs 14 extend at the top of the skirt, cams 15 resulting from radial displacement thereof, also extend at the top of the skirt. It should be noted that the internal wall 12 of skirt 10, before the collar is set on the ring, could have a substantially or perfectly cylindrical shape, as illustrated in FIG. 2. Skirt 10 can then be composed of a cylinder with constant wall thickness except at ribs 14, which are radially projecting outwards on the skirt periphery. This is clearly illustrated in FIG. 2.

Of course, the radially inward distortion of the internal skirt wall 12, thus forming longitudinal cams 15, results in a reduction of the internal diameter of skirt 10. In order to provide proper fastening of the ring on a vessel neck 3, the distance separating two cams facing each other should preferably be smaller than the external diameter of vessel neck 3. Thus, longitudinal cams 15 come into fitted radial contact against the external wall 32 of the vessel neck, as can be seen in FIG. 4a. Vessel neck 3 can be formed, e.g., with a radial thickening 30 projecting outwards. This thickening 30 can further be provided with a peripheral cutout 33. However, it is also possible to think of other vessel neck shapes, e.g. perfectly cylindrical without any profile or relief. Cams 15 are preferably slightly distorted against the external wall 32 of the vessel neck in order to adapt to the neck profile. Indeed, in FIG. 3, it can be seen that cams 15 are slightly flattened against the external neck wall 32, and even penetrates into groove 33 and under thickening 30, as can be seen in FIG. 4a. On the other hand, at connecting segments 13, the ring is not in contact with the neck, but rather in contact with the collar, as can be seen in FIG. 4b and in FIG. 3.

Due to this technique, perfect installation of the collar on the ring as well as perfect fastening of the ring onto the vessel neck by means of the longitudinal skirt ribs 14 only are provided. Also, the collar 2 can be definitely prefitted on the ring 1 prior to installation on the vessel neck.

Figure 5:
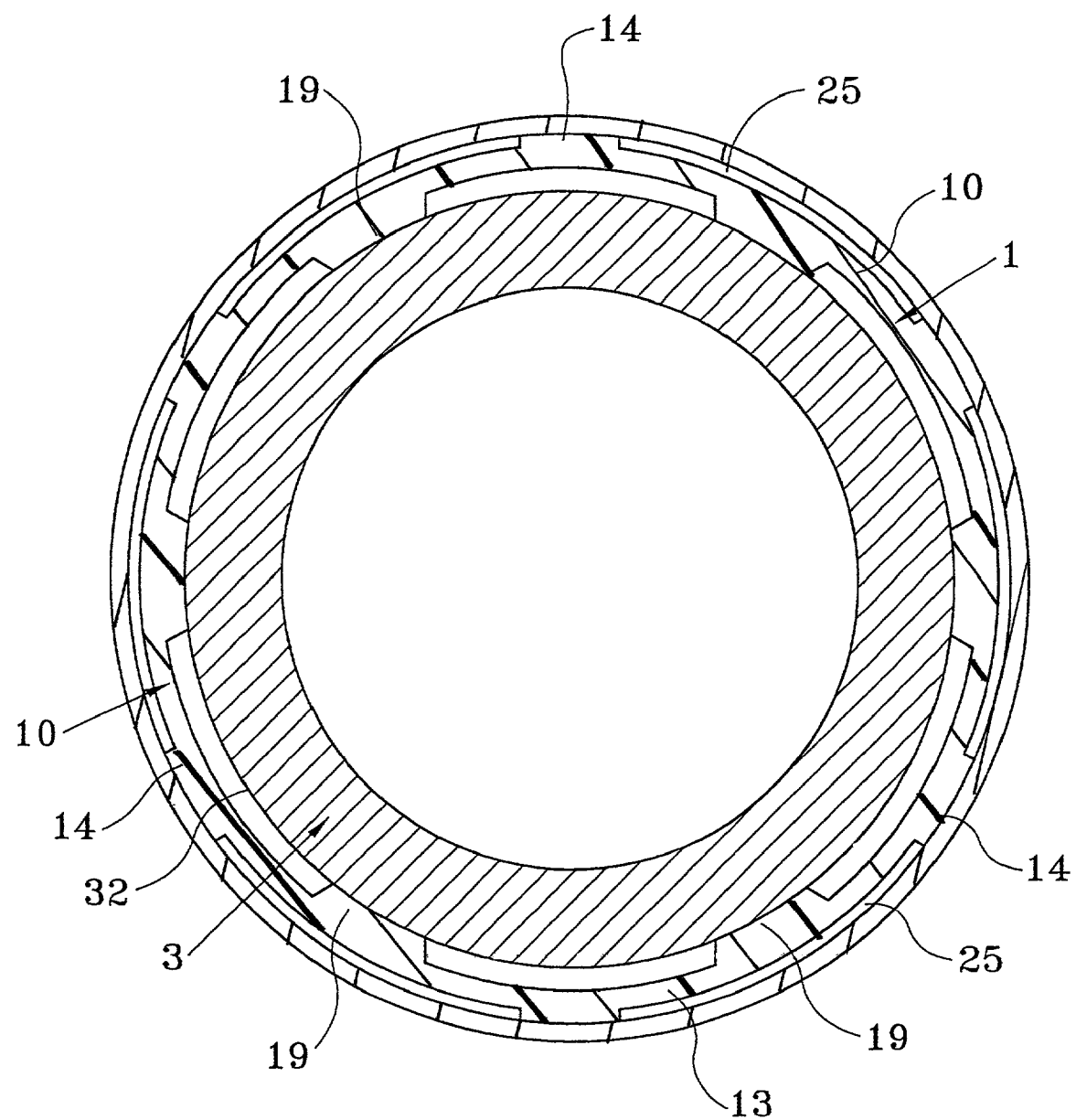
FIG. 5 is a horizontal cross-sectional view through a fastening device according to a second embodiment installed on a vessel neck.
Figure 6:
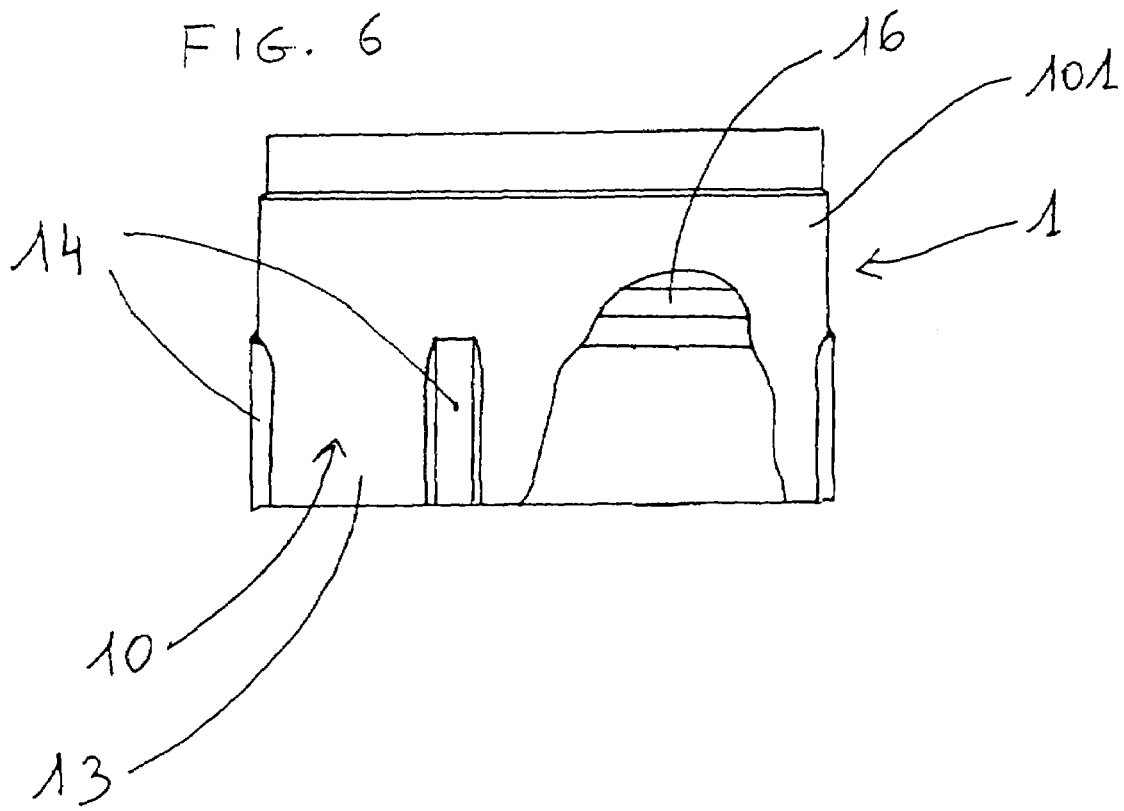
FIG. 6 is a side elevational view of the first embodiment of the retainer ring 1 shown in FIG. 2 with a portion cut away to show interior detail.
Figure 7:
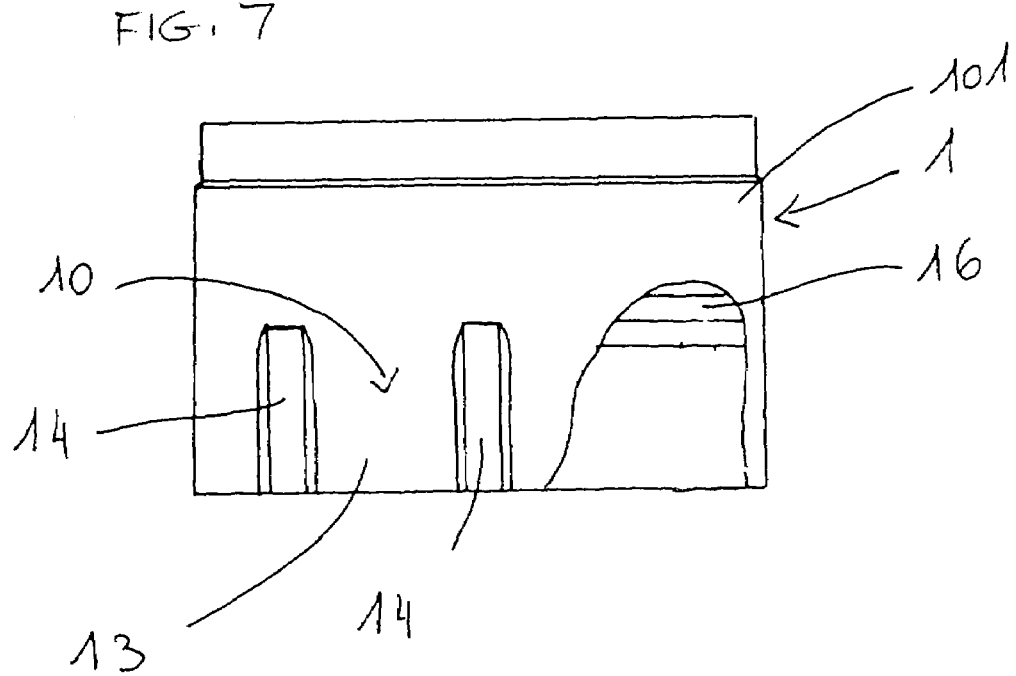
FIG. 7 is a view similar to FIG. 6, but FIG. 7 shows the retainer ring 1 slightly rotated about its vertical axis.

We are now going to refer to FIG. 5 to explain the second embodiment. Retainer ring 1, and more particularly skirt 10 thereof, is also provided with longitudinal ribs 14 extending over the height of the ring on its outside periphery. However, skirt 10 is further provided with internal longitudinal ribs 19 also extending over the height of the skirt. Internal ribs 19 and external ribs 14 are arranged in offset fashion so that one internal rib 19 is located between two ribs 14, and vice versa. As ribs 14 are radially projecting outwards, between the skirt and the collar, at the connecting segments 13, an intermediate clearance 25 is created which extends between external ribs 14. Internal ribs 19 are precisely located at the intermediate clearances 25 so that internal ribs 19 can be displaced or distorted radially outwards without thereby abutting against or distorting the lining collar. This is the case in particular when the ring is installed on a vessel neck 30, as can be seen in FIG. 5. Internal ribs 19 come into fitted abutting contact against the external wall of neck 32 and thus perform fastening through radial fitting. The vessel neck can be formed with a thickening 30 as that of FIGS. 4a and 4b as well as with a peripheral cutout 33. However, it can also be perfectly cylindrical as ribs 19 extend at the top of the skirt and come in radial fitting contact with the neck.

What is claimed is:

1. A device comprising:
   a distribution component to be maintained on a vessel neck having an external wall, the component having an operating rod;
   a retainer ring comprising a skirt defining an internal wall and an external wall, with the internal wall to contact the external wall of the neck, the ring having a through opening for the operating rod; and
   a lining collar surrounding the skirt of the retainer ring, the lining collar defining an internal wall and a visible external wall, the ring and the collar extending about an axially vertical axis, the ring and the collar being definitively secured on the neck,
   characterized in that the external wall of the skirt is formed with longitudinal external ribs extending axially vertically over the height of the skirt, said external ribs coming in fitting contact against the internal wall of the collar, and that the internal wall of the skirt is formed with longitudinal internal ribs extending axially vertically over the height of the skirt.

2. The device according to claim 1, wherein the internal ribs are angularly offset from the external ribs so that one internal rib is located between two external ribs and vice versa.

3. The device according to claim 2, wherein the external wall of the skirt, between the external ribs, is at a distance from the internal wall of the lining collar so as to create an intermediate clearance.

4. A device that includes components for installation on the neck of a vessel having an external wall defined by a radial thickening projecting radially outwardly from the portion of the vessel neck below the radial thickening, said device comprising:
   a distribution component adapted to be maintained on the vessel neck and having an operating rod;
   a retainer ring comprising a skirt defining (1) an internal wall adapted to contact the external wall of the neck, (2) an external wall, and (3) a through opening for the operating rod; and
   a lining collar surrounding the skirt of the retainer ring, the lining collar defining an internal wall and a visible external wall, the ring and the collar extending about an axially vertical axis, the ring and the collar being definitively secured on the vessel neck,
   characterized in that the external wall of the retainer ring skirt is formed with longitudinal external ribs extending axially vertically over the height of the retainer ring skirt, said external ribs coming in fitting contact against the internal wall of the lining collar and extending to a location below said vessel neck radial thickening when said device is assembled on said vessel neck, and wherein
   the internal wall of the retainer ring skirt is formed with longitudinal internal ribs extending axially vertically over the height of the skirt;
   the internal ribs are angularly offset from the external ribs so that one internal rib is located between two external ribs and vice versa; and
   the external wall of the retainer ring skirt, between the external ribs, is spaced radially inwardly from the internal wall of the lining collar so as to create an intermediate clearance.

5. A device comprising:
   a distribution component to be maintained on a vessel neck having an external wall, the component having an operating rod;
   a retainer ring comprising a skirt defining (1) an internal wall adapted to contact the external wall of the neck, (2) an external wall, and (3) a through opening for the operating rod; and
   a lining collar surrounding the skirt of the retainer ring, the lining collar defining an internal wall and a visible external wall, the ring and the collar extending about an axially vertical axis;
   characterized in that the external wall of the retainer ring skirt is formed with longitudinal external ribs extending axially vertically over the height of the retainer ring skirt, said external ribs coming in fitting contact against the internal wall of the lining collar, said external ribs each having a height, each said external rib contacting said internal wall of said lining collar over the entire height of said external rib; and
   wherein
   the internal wall of the retainer ring skirt is radially distorted inwards at the external ribs; and
   before the retainer ring is fitted into the lining collar, the internal wall of the retainer ring skirt is cylindrical, and the external ribs together define a maximum diameter greater than the inside diameter of the lining collar.

6. A device comprising:
   a distribution component to be maintained on a vessel neck having an external wall, the component having an operating rod;
   a retainer ring comprising a skirt defining (1) an internal wall adapted to contact the external wall of the neck, (2) an external wall, and (3) a through opening for the operating rod; and
   a lining collar surrounding the skirt of the retainer ring, the lining collar defining an internal wall and a visible external wall, the ring and the collar extending about an axially vertical axis;
   characterized in that the external wall of the retainer ring skirt is formed with longitudinal external ribs extending axially vertically over the height of the retainer ring skirt, said external ribs coming in fitting contact against the internal wall of the lining collar, said external ribs each having a height, each said external rib contacting said internal wall of said lining collar over the entire height of said external rib; and
   wherein
   the internal wall of the retainer ring skirt is formed with longitudinal internal ribs extending axially vertically over the height of the skirt;
   the internal ribs are angularly offset from the external ribs so that one internal rib is located between two external ribs and vice versa; and
   the external wall of the retainer ring skirt, between the external ribs, is spaced radially inwardly from the internal wall of the lining collar so as to create an intermediate clearance.

7. A device for fastening a distribution component on a vessel neck having an external wall, said device comprising:

a retainer ring comprising a skirt defining an external wall and an internal wall adapted to contact the external wall of the vessel neck;

a lining collar surrounding the skirt of the retainer ring, the lining collar defining an internal wall and a visible external wall;

characterized in that the external wall of the retainer ring skirt is formed with circumferentially spaced, longitudinal external ribs, at least part of the circumference of said retainer ring skirt having a plurality of ribless portions which each extends between two of said external ribs and which deform radially within the lining collar to define an arc configuration after assembly of said lining collar around said retainer ring, whereby said ribless portions contact said lining collar internal wall, and said external ribs contact said lining collar internal wall wherein the internal wall of the retainer ring skirt is formed with longitudinal internal ribs extending axially vertically over the height of the retainer ring skirt;

the internal ribs are angularly offset from the external ribs so that one internal rib is located between two external ribs and vice versa; and the external ribs are evenly distributed around the retainer ring skirt.

* * * * *